(12) United States Patent
Steinbrink et al.

(10) Patent No.: US 10,175,069 B2
(45) Date of Patent: Jan. 8, 2019

(54) SENSOR UNIT FOR A VEHICLE

(71) Applicant: Robert Bosch GmbH, Stuttgart (DE)

(72) Inventors: Ronald Steinbrink, Hoerselberg-Hainich (DE); Stefan Ortmann, Walterhausen (DE); Anwar Hegazi, Frienstedt (DE); Mirko Scheer, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 15/116,957

(22) PCT Filed: Dec. 4, 2014

(86) PCT No.: PCT/EP2014/076515
§ 371 (c)(1),
(2) Date: Aug. 5, 2016

(87) PCT Pub. No.: WO2015/117694
PCT Pub. Date: Aug. 13, 2015

(65) Prior Publication Data
US 2017/0176223 A1 Jun. 22, 2017

(30) Foreign Application Priority Data

Feb. 6, 2014 (DE) .......................... 10 2014 202 208

(51) Int. Cl.
*G01D 11/24* (2006.01)
(52) U.S. Cl.
CPC .................................. *G01D 11/245* (2013.01)
(58) Field of Classification Search
CPC .................................................. G01D 11/245
See application file for complete search history.

(56) References Cited

U.S. PATENT DOCUMENTS

| 6,093,045 A * | 7/2000 | Hoff .................. H01R 13/6273 439/274 |
| 2006/0016274 A1* | 1/2006 | Hattori ................. G01D 11/245 73/862.08 |

FOREIGN PATENT DOCUMENTS

| CN | 1725018 A | 1/2006 |
| CN | 101147045 A | 3/2008 |
| DE | 102 21 931 A1 | 11/2002 |
| DE | 203 13 695 U1 | 1/2004 |

(Continued)

OTHER PUBLICATIONS

International Search Report corresponding to PCT Application No. PCT/EP2014/076515, dated Dec. 4, 2014 (German and English language document) (7 pages).

*Primary Examiner* — Paul M. West
(74) *Attorney, Agent, or Firm* — Maginot, Moore & Beck LLP

(57) ABSTRACT

A sensor unit for a vehicle includes a sensor circuit that is electrically connected to a connection cable via a sensor contact-making-element, a cable contact-making element, and a coaxial contact-making element. The sensor contact-making element includes at least two sensor contacts, and the cable contact-making element includes at least two cable contacts. The coaxial contact-making element is positioned between the cable contact-making element and the sensor contact-making element and includes, at a cable end, a first inner contact point having at least two contacts and, at a sensor end, a second inner contact point having at least to mating contacts.

28 Claims, 11 Drawing Sheets

(56) References Cited

FOREIGN PATENT DOCUMENTS

| | | |
|---|---|---|
| DE | 10 2005 012 709 A1 | 9/2006 |
| DE | 10 2006 029 980 A1 | 1/2008 |
| EP | 1 580 532 A1 | 9/2005 |
| EP | 1 619 507 A2 | 1/2006 |
| FR | 2 692 351 A1 | 12/1993 |
| JP | 5-141998 A | 6/1993 |
| JP | H-09-5340 A | 1/1997 |
| JP | 2002-221529 A | 8/2002 |
| JP | 2004-347557 A | 12/2004 |
| JP | 2008-533494 A | 8/2008 |

* cited by examiner

SENSOR UNIT FOR A VEHICLE

This application is a 35 U.S.C. § 371 National Stage Application of PCT/EP2014/076515, filed on Dec. 4, 2014, which claims the benefit of priority to Serial No. DE 10 2014 202 208.8, filed on Feb. 6, 2014 in Germany, the disclosures of which are incorporated herein by reference in their entirety.

The disclosure relates to a sensor unit for a vehicle.

BACKGROUND

Present-day rotational speed sensors are constructed by means of connecting in an electrical manner an ASIC package, which is based on a lead frame, to a two-core connection cable. The customer-specific application in the vehicle and also the insulation of the electrical components is generally achieved by means of a thermoplastic or duroplastic injection molding process in a simple or modular form. The connection cables together with components for the application in the vehicle and the plug connectors are manufactured on separate production lines. As a result of this manufacturing procedure, it is consequently generally necessary to provide a production line for manufacturing the leads and a costly production line for manufacturing the sensor and also to provide transportation concepts between the two production lines.

In the case of the injection molding process, the ASIC package or the sensor circuit is generally fixed by means of a retaining unit. The sealing arrangement between the retaining unit and the injection molding is provided by means of ribs that have small dimensions and fuse on as a result of the temperature during an injecting process and thus ensure a particular shape and a material closure. The sealing arrangement between the connection cable and the injection molding is performed by means of a mixture formed by activating the interfacial adhesive layers (slightly fusing on) and shrinking on the injection molding during the cooling process. The electrical connection between the lead frames of the ASIC package and the connection cable is usually performed by means of laser soldering, crimping with the aid of a terminal or by crimp connections and also by direct welding the individual leads of the connection cable to the lead frame. The present-day construction is encumbered by considerable disadvantages of long cycle times caused as a result of the heavy shot weight of the synthetic material (cooling down times) and also the great variety of retaining and injection molding tools that are necessary for the different vehicle applications.

DE 10 2005 012 709 A1 discloses by way of example a magnetic field sensor, in particular a rotational speed sensor and/or direction of rotation sensor for a vehicle wheel or for the drive train of a vehicle. The magnetic field sensor comprises a retaining element for a sensor element and where necessary for further sensor components. The retaining element is embodied as an injection molded part and comprises a pocket-like recess in the region of its read-side end face in which the sensor element is supported during the subsequent injection molding process with synthetic material at least in the direction of the injection pressure and thus is protected against mechanical damage. A connection arrangement for the described magnetic field sensor comprises a connection element that comprises two connection pieces in a first contact-making region and said connection pieces are connected respectively by way of a crimp connection in an electrical and mechanical manner to the connection cable ends that have been stripped of insulation. In a second contact-making region, the connection pieces can be connected in an electrical and mechanical manner to connection leads of a sensor element. The connection element is encased at least in part by a synthetic material injection molding sheath that comprises a window-shaped cutout in a transition region between the first contact-making region and the second contact-making region, said window-shaped cutout being sealed during the process of injecting the synthetic material injection molded sheath in the injection molding tool. These connection pieces are initially embodied in one piece so as to facilitate the positioning of the connection element prior to the injection molding process and said connection pieces are subsequently electrically insulated with respect to one another by means of separating the connecting parts.

DE 10 2006 029 980 A1 discloses an exemplary sensor arrangement, in particular a sensor arrangement for sensing the rotational speed and/or direction of rotation for a vehicle wheel or for the drive train of a vehicle. The sensor arrangement comprises a retaining element, at least one sensor element, which is arranged on the retaining element and comprises a connector, wherein the connector is electrically contacted in at least one connection site by way of corresponding connecting means to at least one lead of a connection cable. The connection cable ends that have been stripped of insulation can be connected in an electrical manner by way of example in each case by means of a crimp connection to the connecting means. The end of the at least one lead of the connection cable is embedded with the connecting means at least in part in the retaining element so that a preform is produced, wherein the at least one connection site is recessed for connecting to the sensor element. After contact has been made with the sensor element, the retaining element together with the sensor element can be injection molded with a synthetic material sheath.

DISCLOSURE OF THE INVENTION

The sensor unit in accordance with the disclosure for a vehicle has in contrast the advantage that a new process chain is possible which renders it possible to keep the procedure of connecting the connection cable separate from the procedure of making electrical contact with the sensor circuit until the final application of the customer. As a consequence, it is possible to move the significant synthetic material injection molding process that is preferably a thermoplastic injection molding process to the lead side or to the lead production line and said significant synthetic injection molding process can be used in the form of a standard interface irrespective of the type of applications or rather customer applications. The electrical connection between the connection cable and the sensor circuit that is embodied preferably as an ASIC (Application Specific Integrated Circuit) is performed on a production line that is considerably reduced with regard to the number and complexity by way of a mechanical attaching and/or contact-making process. The customer-specific attachment of the application unit that is required for attaching to the vehicle is performed by means of an adaptable connecting concept that renders it possible to provide further modular concepts of the sensor unit. An essential feature of the manner in which the sensor unit is constructed is the cable outlet behind a screw-on surface. The variation in the orientation with respect to the screw-on surface and also the different angles in which the cable outlet can be guided relative to an attachment bracket represent a great obstacle from the point of view of manufacturing procedure and tool complexity during a standard manufacturing procedure.

Embodiments of the present disclosure render it possible in an advantageous manner by reducing the synthetic material shot weights to achieve short cycle times for the injection molding processes and to increase the automation on the sensor-side. In addition, it is possible to achieve a high degree of standardization and as a consequence a smaller number of tools for the retaining elements. Furthermore, it is possible when manufacturing the leads to insert a cable module at the connection cable sheath with a synthetic material casing for connecting to a contact-making unit. As a consequence, identical conditions when injection molding and sealing the connection cable and the contact-making unit are always achieved. Moreover, it is possible during the procedure of manufacturing the leads to achieve a customer-specific variation of the applications in the form of geometric requirements and/or additional requirements such as by way of example sealing functions or attaching functions in a simple manner by virtue of mountable or injected attachment modules that do not have any influence on internal components. Moreover, different ASIC packages can be achieved such as by way of example BGA (ball grid array) during the procedure of manufacturing a pre-assembled sensor module that comprises the sensor circuit and a sensor housing. By virtue of the contact-making module making contact with the cable in a standardized manner, the customer-specific or vehicle-specific variations can be moved to the procedure of manufacturing the leads, which renders it possible to assemble and finish the sensor unit in a simple manner whilst handling the cable in a simple manner.

Embodiments of the present disclosure provide a sensor unit for a vehicle having a sensor circuit that is connected in an electrical manner to a connection cable by way of a sensor-contacting arrangement, which comprises at least two sensor contacts, and by way of a cable-contacting arrangement, which comprises at least two cable contacts. In accordance with the disclosure, a coaxial contacting arrangement is arranged between the cable-contacting arrangement and the sensor-contacting arrangement and said coaxial contacting arrangement comprises on the cable-side a first inner contact-making site having at least two contacts and on the sensor-side a second inner contact-making site having at least two mating contacts.

As a consequence, embodiments of the sensor unit in accordance with the disclosure render it possible in an advantageous manner to make contact with the sensor circuit in a manner that is independent of the angle of rotation, in other words said contact is flexible over 360° and as a consequence a high degree of flexibility is achieved when making adjustments to suit the installation space in the vehicle or to suit the customer-specific applications with a high degree of standardization of the cable module.

By virtue of the further developments and measures disclosed in the description, claims, and drawings, advantageous embodiments are possible for the sensor unit for a vehicle.

It is particularly advantageous that the cable-contacting arrangement and the first inner contact-making site of the coaxial cable-contacting arrangement are embodied at different ends of a common first contact carrier and together with a base body and the connection cable can form a cable module. The cable module can guide the connection cable by way of example in an axial manner or at a predetermined angle with respect to the first inner contact-making site.

In an advantageous embodiment of the sensor unit in accordance with the disclosure, the sensor-contacting arrangement and the second inner contact-making site of the coaxial contacting arrangement can be embodied at different ends of a common second contact carrier and together with a base body form a contact-making module.

In a further advantageous embodiment of the sensor unit in accordance with the disclosure, the base body of the cable module and/or the base body of the contact-making module can be embodied in each case as a synthetic material injection molded part that encases at least in part the respective contact carrier. As a consequence, the cable module can be manufactured in an advantageous manner on separate production lines and the individual manufacturing processes can be optimized separately from one another.

In a further advantageous embodiment of the sensor unit in accordance with the disclosure, the contact carriers can be embodied as stamped and bent parts that have predetermined separating sites by way of which the common contact carriers can be divided into individual current paths. Such stamped and bent parts can be produced advantageously in a cost-effective manner in large numbers.

In a further advantageous embodiment of the sensor unit in accordance with the disclosure, the coaxial contacting arrangement can be embodied by way of example as a resilient-elastic connection and/or plug connection between the individual contacts and the corresponding mating contacts.

In a further advantageous embodiment of the sensor unit in accordance with the disclosure, a first contact pair of the coaxial contacting arrangement, said contact pair comprising a first contact and a corresponding first mating contact, can be embodied as a middle contacting arrangement, and a second contact pair that comprises a second contact and a corresponding second mating contact can be embodied as an outer contacting arrangement of the coaxial contacting arrangement. The first contact of the middle contacting arrangement of the coaxial contacting arrangement can be embodied by way of example as a contact surface or as a contact surface having a receiving opening or a contact pin. The second contact of the outer contacting arrangement of the coaxial contacting arrangement can be embodied by way of example as a contact pin or contact clamp or as a contact annular surface. The first mating contact of the middle contacting arrangement of the coaxial contacting arrangement can be embodied by way of example as a spring contact or contact pin. The second mating contact of the outer contacting arrangement of the coaxial contacting arrangement can be embodied by way of example as a spring contact or contact pin or contact clamp. In the case of one possible embodiment, the outer contacting arrangement of a first coaxial contacting arrangement can comprise a contact ring that can connect in an electrical manner the second contact, which is embodied as a contact pin, to the second contact that is embodied as a contact spring. Alternatively, the outer contacting arrangement of a second coaxial contacting arrangement comprises an electrically conductive bush that can connect in an electrical manner the second contact, which is embodied as a contact clamp, to the second mating contact that is embodied as a contact clamp. A third coaxial contacting arrangement can comprise a contact disc that can comprise an electrically conductive outer ring, which comprises multiple contact openings and an electrical conductive inner ring having one contact opening. A first contact that is embodied as a contact pin can be connected in an electrical manner to the inner ring, and a first mating contact that is embodied as a contact pin can be connected in an electrical manner to the inner ring by way of the contact opening. A second contact that is embodied as a contact pin can be connected in an electrical manner to the outer ring, and a second mating contact that is embodied as a contact pin can be connected in an electrical manner to the outer ring by way of one of the contact openings.

In a further advantageous embodiment of the sensor unit in accordance with the disclosure, the electrical cable-contacting arrangement between the connection cable and the at least one cable contact can be embodied as a mechanical connection preferably as a crimp connection and/or an insulation displacement connection.

In a further advantageous embodiment of the sensor unit in accordance with the disclosure, a base body of an attachment module can be embodied as a synthetic material injection molded part that encases the coaxial contacting arrangement. The attachment module can comprise by way of example an attachment bracket that is formed as one on the base body and comprises a attachment eyelet. It is possible when assembling the sensor unit to push the cable module and the contact-making module into the attachment module and to make the connection thereto in a fluid-tight manner.

In a further advantageous embodiment of the sensor unit in accordance with the disclosure, the sensor circuit can be arranged in a cap and together with said cap can form a sensor module. The package of the sensor circuit or of the ASIC arranged in the cap can be embodied by way of example in a novel LGA (liquid grid array) and/or BGA (ball grid array) and/or QFN/MLP (micro lead frame package) or as an integrated circuit (IC) based on a conventional lead frame. The sensor module can be pushed onto the contact-making module in a fluid-tight manner, wherein the sensor circuit is contacted in an electrical manner by way of the sensor-contacting arrangement. Since it is no longer necessary for the sensor circuit or the ASIC to be injection molded, it is possible for the process window to be larger. It is preferred that the cable module and/or the contact-making module and/or the attachment module and/or the sensor module can be embodied as pre-assembled modules that can be manufactured separately from one another.

Exemplary embodiments of the disclosure are illustrated in the drawings and are further explained in the description hereinunder. Identical components or elements that perform identical or similar functions are identified in the drawings by identical reference numerals.

SHORT DESCRIPTION OF THE DRAWINGS

DETAILED DESCRIPTION

Figure 1:
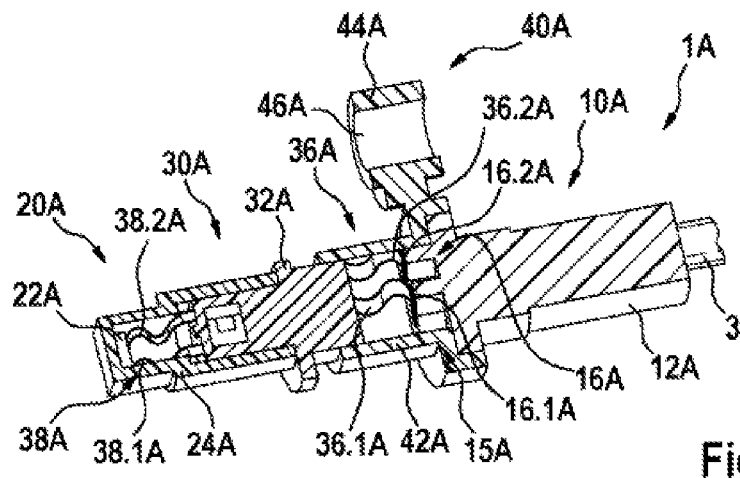
FIG. 1 illustrates a schematic perspective sectional view of a first exemplary embodiment of a sensor unit in accordance with the disclosure.

As is evident in FIGS. 1 to 39, the illustrated exemplary embodiments of a sensor unit in accordance with the disclosure 1A, 1B, 1C, 1D for a vehicle comprise in each case a sensor circuit 22A, 22B, 22C that is connected in an electrical manner to a connection cable 3 by way of a sensor-contacting arrangement 38A, 38B, 38C, which comprises at least two sensor contacts 38.1A, 38.1B, 38.1C, 38.2A, 38.2B, 38.2C, and a cable-contacting arrangement 18A, 18B, 18C, which comprises at least two cable contacts 18.1A, 18.1B, 18.1C, 18.1D, 18.2A, 18.2B, 18.2C, 18.2D. In accordance with the disclosure, a coaxial contacting arrangement 15A, 15B, 15C is arranged between the cable-contacting arrangement 18A, 18B, 18C and the sensor-contacting arrangement 38A, 38B, 38C, said coaxial contacting arrangement 15A, 15B, 15C comprising on the cable side a first inner contact-making site 16A, 16B, 16C, 16C having at least two contacts 16.1A, 16.1B, 16.1C, 16.1D, 16.2A, 16.2B, 16.2C, 16.2D and on the sensor side a second inner contact-making site 36A, 36B, 36C having at least two mating contacts 36.1A, 36.1B, 36.1C, 36.2A, 36.2B, 36.2C.

The cable-contacting arrangement 18A, 18B, 18C and the first inner contact-making site 16A, 16B, 16C, 16, C of the coaxial contacting arrangement 15A, 15B, 15C are formed at different ends of a common first contact carrier 14A, 14B, 14C, 14D and together with a base body 12A, 12B, 12C, 12D, 12E and the connection cable 3 form a cable module 10A, 10B, 10C, 10D, 10E.

As is further evident in FIG. 1, a first cable module 10A guides the connection cable 3 in the case of a first exemplary embodiment of the sensor unit in accordance with the disclosure 1A in an axial manner with respect to the first inner contact-making site 16A. As is further evident in FIG. 2, a second cable module 10B guides the connection cable 3 in the case of a second exemplary embodiment of the sensor unit in accordance with the disclosure 1B at a predetermined angle, in this case at an angle of 90°, with respect to the first inner contact-making site 16A.

As is further evident in FIGS. 1 to 12, the sensor circuit 22A is arranged in the case of the first two exemplary embodiments of the sensor unit in accordance with the disclosure 1A, 1B in a cap 24A and together with this cap 24A forms a pre-assembled sensor module 20A. The sensor-contacting arrangement 38A and the second inner contact-making site 36A of the coaxial contacting arrangement 15A are in the case of the first two exemplary embodiments of the sensor unit in accordance with the disclosure 1A, 1B formed in each case at different ends of a common second contact carrier 34A and together with a base body 32A form a contact-making module 30A. The sensor module 20A is pushed onto the contact-making module 30A and connected thereto in a fluid-tight manner, wherein the sensor circuit 22A is contacted in an electrical manner by way of the sensor-contacting arrangement 38A.

As is further evident in FIGS. 1 to 12, the base body 12A, 12B of the cable module 10A, 10B and/or the base body 32A of the contact-making module 30A are embodied in the case of the first and second exemplary embodiment of the sensor unit in accordance with the disclosure 1A, 1B in each case as a synthetic material injection molded part that encompasses at least in part the respective contact carrier 14A, 34A that is embodied as a stamped and bent part. As is evident in particular in FIGS. 5 and 6, the second contact carrier 34A is embodied with at least one predetermined separation site 35A by way of which the common contact carrier 34A can be divided into individual current paths. After the injection molding process for forming the base body 32A of the contact-making module 30A, the at least one separation site 35A is separated between the current paths.

As is further evident in FIGS. 1 to 12, the coaxial contacting arrangement 15A is embodied as a resilient-elastic connection between the individual contacts 16.1A, 16.2A of the first inner contact-making site 16A, which is arranged at a first end of the first contact carrier 14A, and the corresponding mating contacts 36.1A, 36.2A of the second inner contact-making site 36A, which is arranged at one end of the second contact carrier 34A. A middle contacting arrangement of the coaxial contacting arrangement 15A comprises a first contact pair that comprises a first contact 16.1A of the first inner contact-making site 16A and a corresponding first mating contact 36.1A of the second inner contact-making site 16A. An outer contacting arrangement of the coaxial contacting arrangement 15A comprises a second contact pair that comprises a second contact 16.2A of the first inner contact-making site 16A and a corresponding second mating contact 36.2A of the second inner contact-making site 16A. As is evident in particular in FIGS. 9 and 10, in the case of the first two exemplary embodiments of the sensor unit in accordance with the disclosure 1A, 1B, the first contact of the middle contacting arrangement of the coaxial contacting arrangement 15A is embodied as a contact surface 16.1A that is connected in an electrical manner by way of the first contact carrier 14A to a first cable contact 18.1A of the cable-contacting arrangement 18A. The second contact of the outer contacting arrangement of the coaxial contacting arrangement 15A is embodied as a contact pin 16.2A that is connected in an electrical manner by way of the first contact carrier 14A to a second cable contact 18.2A of the cable-contacting arrangement 18A. In the first and second exemplary embodiment of the sensor unit 1A, 1B, the outer contacting arrangement comprises a contact ring 16.3A that is embodied as a circumferential contact surface and is connected in an electrical manner by way of a contact connection piece 16.4A to the contact pin 16.2A. The contact ring 16.3A can be pushed onto the second contact, which is embodied as a contact pin 16.2A, by way of example after injection molding the base body 12A of the cable module 10A, 10B. The contact ring 16.3A can be supported by way of example in an axial manner at protruding overhangs of the base body 12A. The two mating contacts 36.1A, 36.2A of the second inner contact stele 36A are embodied in each case as spring contacts (for example S-springs, C springs or leaf spring contacts). The first mating contact 36.1 is embodied as a middle spring contact that in the assembled state abuts against the first contact, which is embodied as a contact surface 16.1A, and produces an electrical connection. The second mating 36.2 is embodied as an outer-middle spring contact that in the assembled state abuts against the second contact, which is embodied as a contact ring 16.3A, and produces an electrical connection. Consequently, the second contact, which is embodied as a contact pin 16.2A, is connected in an electrical manner by way of the contact ring 16.3A to a second mating contact, which is embodied as a contact spring 36.2A. This arrangement renders it possible to make a contact irrespective of the angular position. The first mating contact 36.1A of the second inner contact-making site 36A is connected in an electrically conductive manner by way of a first current path of the second contact carrier 34A to a first sensor contact 38.1A of the sensor-contacting arrangement 38A. The second mating contact 36.2A of the second inner contact-making site 36A is connected in an electrically conductive manner by way of a second current path of the second contact carrier 34A to a second sensor contact 38.2A of the sensor-contacting arrangement 38A. Consequently, the second contact, which is embodied as a contact pin 16.2A, is connected in an electrical manner by way of the contact ring 16.3A to a second mating contact, which is embodied as a contact spring 36.2A. In a similar manner, the two sensor contacts 38.1A, 38.2A of the sensor-contacting arrangement 38A are embodied in each case as spring contacts (for example S-springs, C springs or leaf spring contacts) that can be contacted in an electrical manner at corresponding contact sites [not further described] of the sensor circuit 22A. The first sensor contact 38.1 is embodied as an outer-middle spring contact that in the assembled state abuts against a first contact site of the sensor circuit 22A and produces an electrical connection. The second sensor contact 38.2 is likewise embodied as an outer-middle spring contact that in the assembled state abuts against a second contact site of the sensor circuit 22A and produces an electrical connection.

Figure 9:
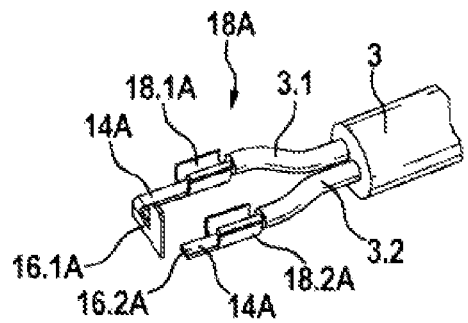
FIGS. 9 to 12 illustrate in each case a view of intermediate products during the production of the first exemplary embodiment of the cable module in accordance with FIG. 8 for the sensor unit in accordance with the disclosure in accordance with FIG. 1.
Figure 10:
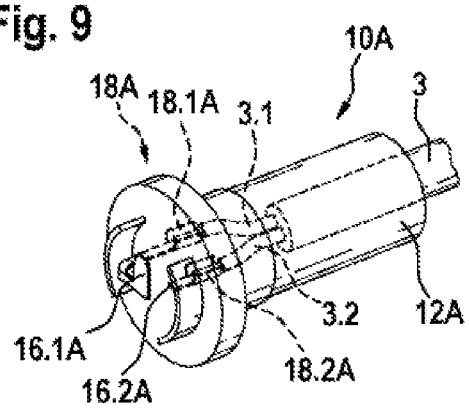
Figure 11:
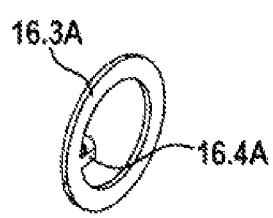
Figure 12:
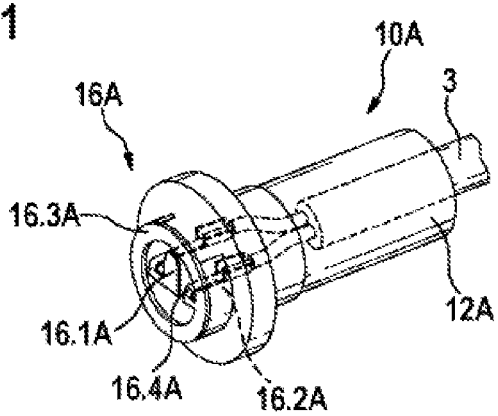

As is evident in particular in FIGS. 9 and 10, the electrical cable-contacting arrangement 18A between the connection cable 3 and the at least one cable contact 18.1A, 18.2A is embodied as a mechanical connection in the form of a crimp connection. As an alternative, the mechanical connection can be embodied by way of example as an insulation displacement connection. By means of the mechanical connection, a first individual lead 3.1 is connected in an electrical manner to the first cable contact 18.1A, and a second individual lead 3.2 is connected in an electrical manner to the second cable contact 18.2A.

Figure 2:
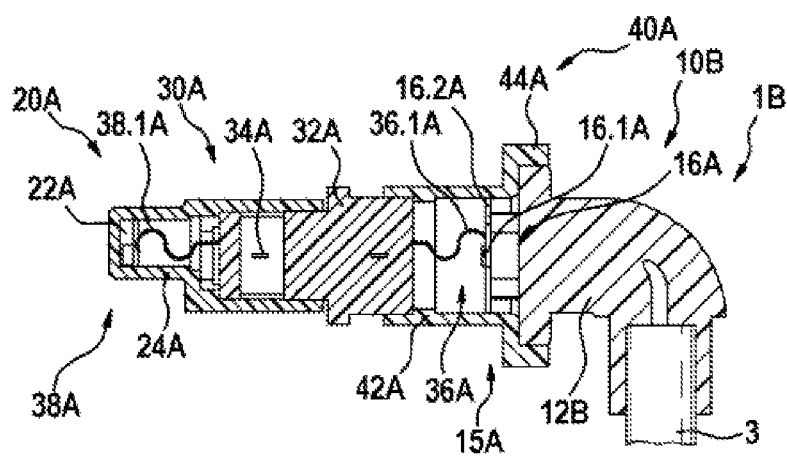
FIG. 2 illustrates a schematic perspective sectional view of a second exemplary embodiment of a sensor unit in accordance with the disclosure.
Figure 3:
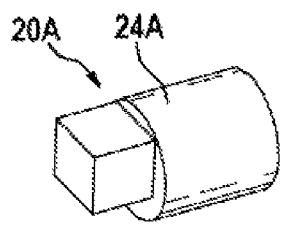
FIG. 3 illustrates a schematic perspective view of a first embodiment of a sensor module for the sensor unit in accordance with the disclosure in accordance with FIG. 1 or FIG. 2.
Figure 4:
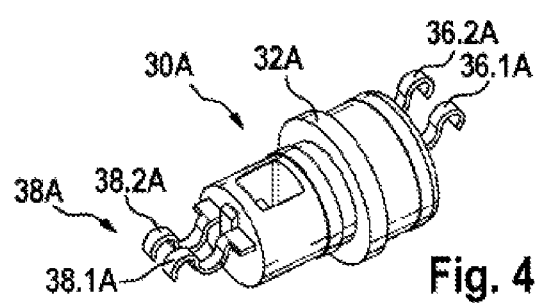
FIG. 4 illustrates a schematic perspective view of a first exemplary embodiment of a contact-making module for the sensor unit in accordance with the disclosure in accordance with FIG. 1 or FIG. 2.
Figure 5:
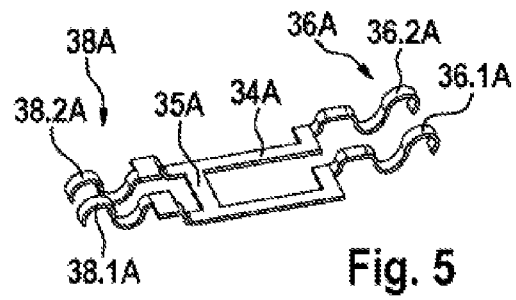
FIG. 5 illustrates a schematic perspective view of a first exemplary embodiment of a contact carrier for the contact-making module in accordance with FIG. 4.
Figure 6:
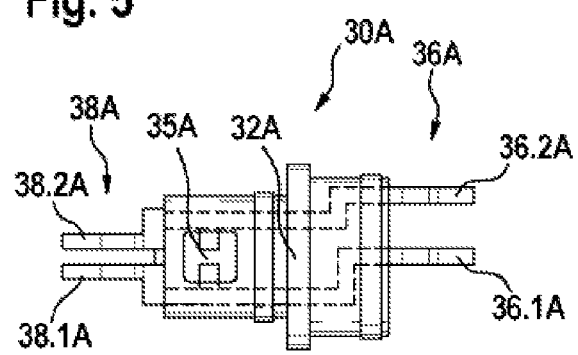
FIG. 6 illustrates a schematic perspective plan view of the contact-making module in accordance with FIG. 4.
Figure 7:
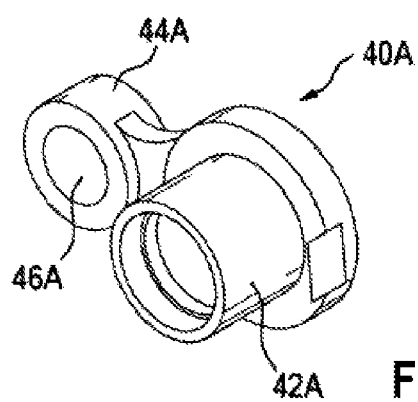
FIG. 7 illustrates a schematic perspective view of a first exemplary embodiment of an attachment module for the sensor unit in accordance with the disclosure in accordance with FIG. 1 or FIG. 2.
Figure 8:
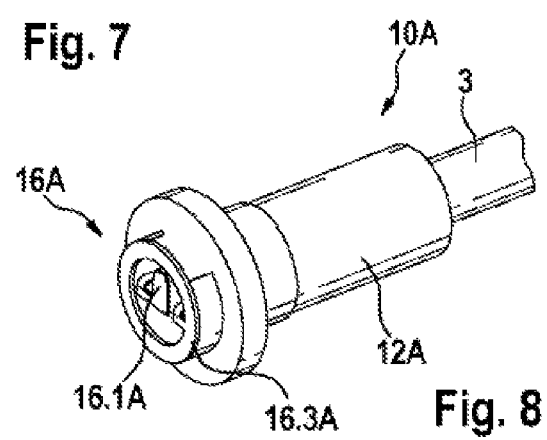
FIG. 8 illustrates a schematic perspective view of a first exemplary embodiment of a cable module for the sensor unit in accordance with the disclosure in accordance with FIG. 1 or FIG. 2.

As is further evident in FIGS. 1, 2 and 7, a base body 42A of an attachment module 40A is embodied as a synthetic material injection molded part that encompasses the region of the coaxial contacting arrangement 15A. The attachment module 40A comprises in the illustrated exemplary embodiments an attachment bracket 44A that is formed as one on the base body 42A and comprises an attachment eyelet 46A. The attachment eyelet 46A can be inserted by way of example as an insertion part into the injection molding tool or can be pressed into a corresponding opening in the attachment bracket 44A after the injection molding process.

In order to assemble the sensor unit 1A, 1B, the sensor module 20A and its cap 24A are pushed onto the contact-making module 30A and attached in a fluid-tight manner, wherein the sensor circuit 22A is connected in an electrical manner by way of the sensor-contacting arrangement 38A. In addition, the cable module 10A and the contact-making module 30A are pushed into the attachment module 40A and attached in a fluid-tight manner, wherein the individual contacts 16.1A, 16.2A of the first inner contact-making site 16A and the corresponding mating contacts 36.1A, 36.2A of the second inner contact-making site 36A are connected one to the other in an electrical manner. The connection sites between the modules 10A, 20A, 30A, 40A are embodied in such a manner that a mechanical pre-fixing procedure and a final connecting procedure can be implemented by means of a laser. The cable module 10A, 10B is connected to the attachment module 40A by way of example by means of a simple attaching procedure. By virtue of a non-positive and/or positive connection, the cable module 10A, 10B is held in position so as to render transportation possible. The final fixing procedure and sealing of the cable module 10A, 10B or of the contact-making module 30A in the attachment module 40A for the duration of the serviceable life is performed by means of a weld connection (for example laser, laser beam etc.) or by means of a mechanical connection. In addition, the connections between the modules 10A, 10B, 20A, 30A, 40A can be designed in such a manner that it is possible to provide a sealing arrangement by way of an optional seal (for example an O-ring). It is thus possible to arrange an optional seal by way of example between the cap 24A of the sensor module 20A and the base body 32A of the contact-making module 40A and/or between the base body 42A of the attachment module 40A and the base body 32A of the contact-making module 40A and/or between the base body 12A of the cable module 10A and the base body 42A of the attachment module 40A. The length of the sensor unit 1A, 1B can be varied by means of contact-making modules 30A of different lengths, without influencing the connection sites, in other words the sensor-contacting arrangement 38A and/or the coaxial contacting arrangement 15A and/or the cable-contacting arrangement 18A.

Figure 13:
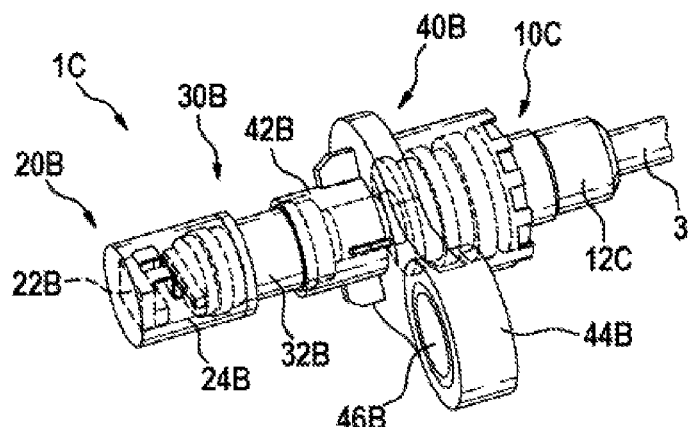
FIG. 13 illustrates a schematic perspective view of a third exemplary embodiment of a sensor unit in accordance with the disclosure.
Figure 14:
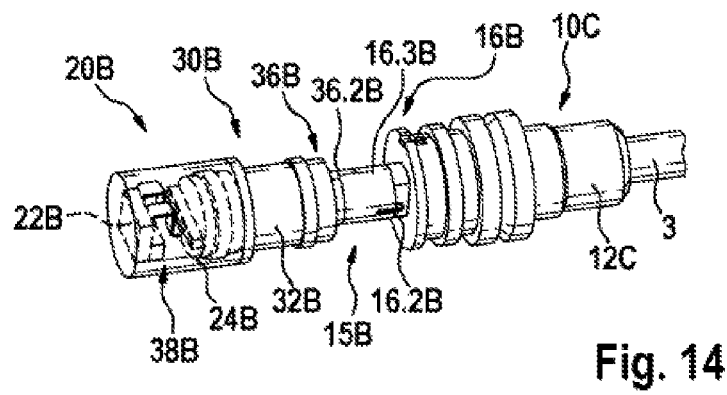
FIG. 14 illustrates a schematic perspective view of the sensor unit in accordance with the disclosure shown in FIG. 13 without the attachment module.
Figure 15:
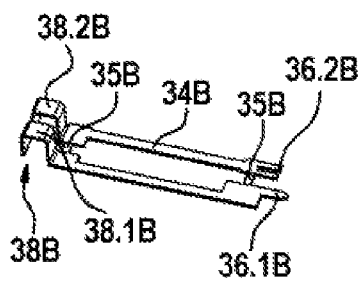
FIGS. 15 to 17 illustrate in each case a view of intermediate products during the production of a second exemplary embodiment of a contact-making module and a second exemplary embodiment of a sensor module for the sensor unit in accordance with the disclosure in accordance with FIG. 13.
Figure 16:
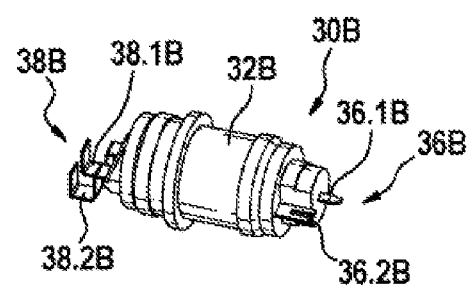
Figure 17:
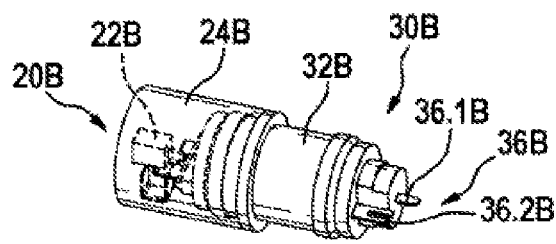
Figure 18:
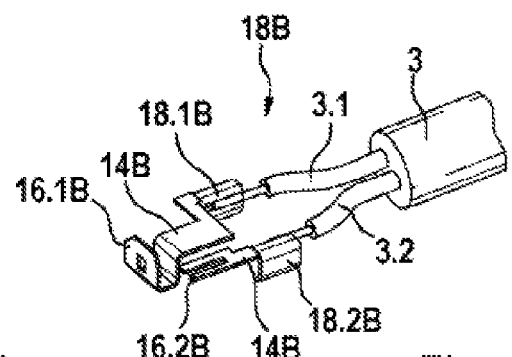
FIGS. 18 to 22 illustrate in each case a view of intermediate products during the production of a third exemplary embodiment of a cable module for the sensor unit in accordance with the disclosure in accordance with FIG. 13.
Figure 19:
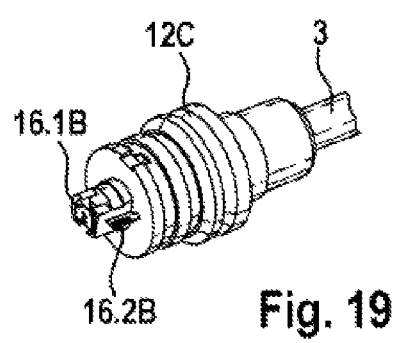
Figure 20:
Figure 21:
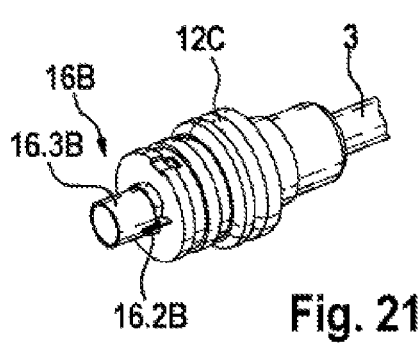
Figure 22:
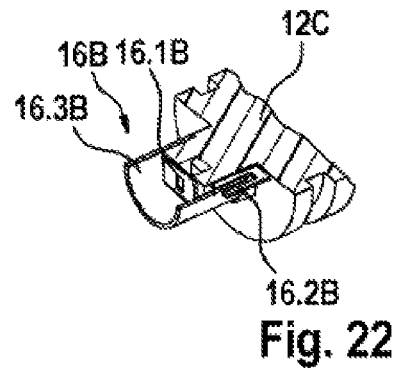

As is further evident in FIG. 13, a third cable module 10C guides the connection cable 3 in the case of a third exemplary embodiment of the sensor unit in accordance with the disclosure 1C in an axial manner with respect to the first inner contact-making site 16B.

As is further evident in FIGS. 13 to 22, the sensor circuit 22B in the first exemplary embodiment of the sensor unit in accordance with the disclosure 1C is arranged in a similar manner to the first and second exemplary embodiment in a cap 24B and together with this cap 24B forms a sensor module 20B. The sensor-contacting arrangement 38B and the second inner contact-making site 36B of the coaxial contacting arrangement 15B are embodied in the third exemplary embodiment of the sensor unit in accordance with the disclosure 1C at different ends of a common second contact carrier 34B and together with a base body 32B form a contact-making module 30B. The sensor module 20B is pushed onto the contact-making module 30B and is connected thereto in a fluid-tight manner, wherein the sensor circuit 22B is connected in an electrical manner by way of the sensor-contacting arrangement 38B. In a similar manner to the first and second exemplary embodiment, the base body 12C of the cable module 10C and/or the base body 32B of the contact-making module 30B in the third exemplary embodiment of the sensor unit in accordance with the disclosure 1C are embodied in each case as a synthetic material injection molded part that encases at least in part the respective contact carrier 14B, 34B that is embodied as a stamped and bent part. As is evident in particular in FIGS. 15 and 16, the second contact carrier 34B is embodied with at least one predetermined separation site 35B by way of which the common contact carrier 34B can be divided into individual current paths. After the injection molding process for forming the base body 32B of the contact-making module 30B, the at least one separation site 35B is separated between the current paths.

As is further evident in FIGS. 13 to 22, the coaxial contacting arrangement 15B is embodied as a plug-type connection between the individual contacts 16.1B, 16.2B of the first inner contact-making site 16B, which is arranged at a first end of the first contact carrier 14B, and the corresponding mating contacts 36.1B, 36.2B of the second inner contact-making site 36B, which is arranged at an end of the second contact carrier 34B. A middle contacting arrangement of the coaxial contacting arrangement 15B comprises a first contact pair that comprises a first contact 16.1B of the first inner contact-making site 16B and a corresponding first mating contact 36.1B of the second inner contact-making site 16B. An outer contacting arrangement of the coaxial contacting arrangement 15B comprises a second contact pair that comprises a second contact 16.2B of the first inner contact-making site 16B and a corresponding second mating contact 36.2B of the second inner contact-making site 16B. As is evident in particular in FIGS. 19 and 20, in the third exemplary embodiment of the sensor unit in accordance with the disclosure 1C, the first contact of the middle contacting arrangement of the coaxial contacting arrangement 15B is embodied as a contact surface 16.1B having a receiving opening that is connected in an electrical manner by way of the first contact carrier 14B to a first cable contact 18.1B of the cable-contacting arrangement 18B. The second contact of the outer contacting arrangement of the coaxial contacting arrangement 15B is embodied as a contact clamp 16.2B that is connected in an electrical manner by way of the first contact carrier 14B to a second cable contact 18.2B of the cable-contacting arrangement 18B. In the first exemplary embodiment of the sensor unit 1C, the outer contacting arrangement comprises a contact bush 16.3B that forms a circumferential contact body and by means of being pushed onto the contact clamp 16.2B is connected in an electrical manner thereto. The contact bush 16.3B can be pushed onto the second contact, which is embodied as a contact clamp 16.2B, by way of example after injection molding the base body 12C of the cable module 10C. The first mating contact 36.1B of the second inner contact-making site 36B is embodied as a middle contact pin 36.1B that in the assembled state is inserted into the receiving opening of the first contact, which is embodied as a contact surface 16.1B, and produces an electrical connection. The second mating contact 36.2 is embodied as an outer-middle contact clamp 36.2B that in the assembled state is pushed into the contact bush 16.3B and is connected in an electrical manner by way of the contact bush 16.3B to the second contact 16.2B. Consequently, the second contact, which is embodied as a contact clamp 16.2B, is connected in an electrical manner by way of the contact bush 16.3B to the second mating contact, which is embodied as a contact clamp 36.2B. This arrangement renders it possible likewise to make a connection irrespective of the angular position. The first mating contact 36.1B of the second inner contact-making site 36B is connected in an electrically conductive manner by way of a first current path of the second contact carrier 34B to a first sensor contact 38.1B of the sensor-contacting arrangement 38B. The second mating contact 36.2B of the second inner contact-making site 36B is connected in an electrically conductive manner by way of a second current path of the second contact carrier 34B to a second sensor contact 38.2B of the sensor-contacting arrangement 38B. In the first exemplary embodiment of the sensor unit in accordance with the disclosure 1C, the two sensor contacts 38.1B, 38.2B of the sensor-contacting arrangement 38B are embodied in each case as an outer-middle contact bracket which can be connected in an electrical manner to corresponding contact sites [not further described] of the sensor circuit 22B by way of example by means of soldering, riveting and/or welding.

In a similar manner to the first two exemplary embodiments, the electrical cable-contacting arrangement 18B between the connection cable 3 and the at least one cable contact 18.1B, 18.2B in the third exemplary embodiment of the sensor unit in accordance with the disclosure 1C is embodied as a mechanical connection in the form of a crimp connection. As an alternative, the mechanical connection can be embodied by way of example as an insulation displacement connection. By virtue of the mechanical connection, a first individual lead 3.1 is connected in an electrical manner to the first cable contact 18.1B, and a second individual lead 3.2 is connected in an electrical manner to the second cable contact 18.2B.

As is further evident in FIG. 13, a base body 42B of an attachment module 40B is embodied as a synthetic material injection molded part that encompasses the region of coaxial contacting arrangement 15B and is injection molded onto a sensor-side end of the cable module 10C and onto a cable-side end of the contact-making module 30B. In a similar manner to the first two exemplary embodiments, the attachment module 40B in the illustrated third exemplary embodiment of the sensor unit in accordance with the disclosure 1C comprises an attachment bracket 44B that is formed as one on the base body 42B and comprises an attachment eyelet 46B. The attachment eyelet 46B can be inserted by way of example as an insertion part into the injection molding tool or can be pressed into a corresponding opening in the attachment bracket 44B after the injection molding process.

In order to assemble the sensor unit 1C, the sensor circuit 22B of the sensor module 20B is contacted in an electrical manner by way of the corresponding contact sites at the sensor contacts 38.1B, 38.2B of the sensor-contacting arrangement 38B of the contact-making module. Subsequently, the cap 24B of the sensor module 20B is pushed onto the contact-making module 30B and attached thereto in a fluid-tight manner. In addition, the cable module 10B and the contact-making module 30B are plugged together by way of the coaxial contacting arrangement 15B and the attachment module 40B is injection molded on. As an alternative, the base body 42B of the attachment module 40B can be pushed onto the base body 12C of the cable module 10C or onto the base body 32B of the contact-making module and attached thereto in a fluid-tight manner prior to plugging together the cable module 10C and the contact-making module 30B by way of the coaxial contacting arrangement 15B. After the sensor unit 1C has been assembled, the individual contacts 16.1B, 16.2B of the first inner contact-making site 16B and the corresponding mating contacts 36.1B, 36.2B of the second inner contact-making site 36B are connected in an electrical manner one to the other. The connection sites between the modules 10C, 20B, 30B, 40B are designed in such a manner that a mechanical pre-fixing procedure and a final connecting procedure can be performed using a laser. In addition, the connections between the modules 10C, 20B, 30B, 40B can be designed in such a manner that a sealing arrangement can be achieved by way of an optional seal (for example an O-ring). It is thus possible to arrange an optional seal by way of example between the cap 24B of the sensor module 20B and the base body 32B of the contact-making module 40B and/or between the base body 42B of the attachment module 40B and the base body 32B of the contact-making module 40B and/or between the base body 12C of the cable module 10C and the base body 42B of the attachment module 40B. The length of the sensor unit 1C can be varied by means of contact-making modules 30B of different lengths, without influencing the connection sites, in other words the sensor-contacting arrangement 38B and/or the coaxial contacting arrangement 15B and/or the cable-contacting arrangement 18B.

Figure 23:
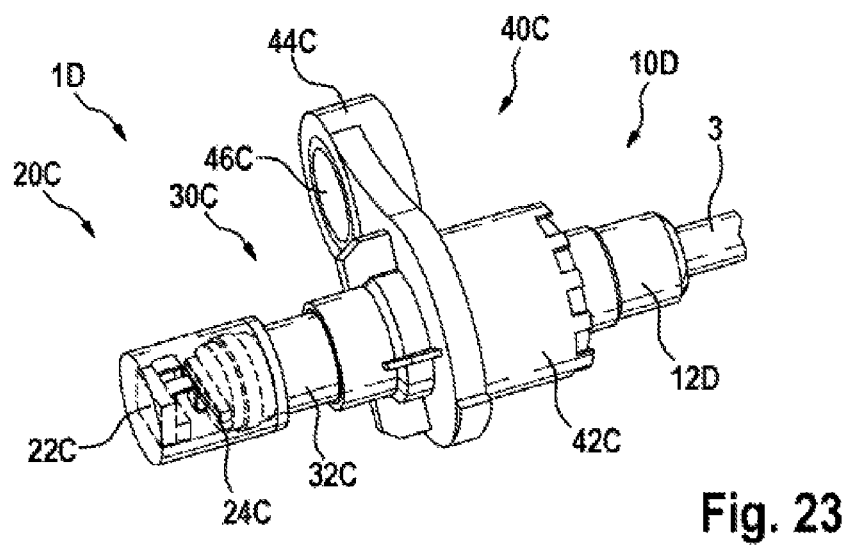
FIG. 23 illustrates a schematic perspective view of a fourth exemplary embodiment of a sensor unit in accordance with the disclosure.

As is further evident in FIG. 23, a fourth cable module 10D guides the connection cable 3 in the case of a fourth exemplary embodiment of the sensor unit in accordance with the disclosure 1D in an axial manner with respect to the first inner contact-making site 16C.

As is further evident in FIGS. 23 to 32, the sensor circuit 22C in the fourth exemplary embodiment of the sensor unit in accordance with the disclosure 1D is arranged in a similar manner to the third exemplary embodiment in a cap 24C and together with this cap 24C forms a sensor module 20C. The sensor-contacting arrangement 38C and the second inner contact-making site 36C of the coaxial contacting arrangement 15C are formed in the fourth exemplary embodiment of the sensor unit in accordance with the disclosure 1D at different ends of a common second contact carrier 34C and together with a base body 32C form a contact-making module 30C. The sensor module 20C is pushed onto the contact-making module 30C and connected thereto in a fluid-tight manner, wherein the sensor circuit 22C is connected in an electrical manner by way of the sensor-contacting arrangement 38C. In a similar manner to the third exemplary embodiment, the base body 12D of the cable module 10D and/or the base body 32D of the contact-making module 30D in the fourth exemplary embodiment of the sensor unit in accordance with the disclosure 1D are embodied in each case as a synthetic material injection molded part that encases at least in part the respective contact carriers 14C, 34C that is embodied as a stamped and bent part. As is evident in particular in FIGS. 26 and 27, the second contact carrier 34C is embodied with at least one predetermined separation site 35CB by way of which the common contact carrier 34C can be divided into individual current paths. After the injection molding process for forming the base body 32C of the contact-making module 30C, the at least one separation site 35C is separated between the current paths.

As is further evident in FIGS. 23 to 32, the coaxial contacting arrangement 15C is embodied as a plug-type connection between the individual contacts 16.1C, 16.2C of the first inner contact-making site 16C, which is arranged at a first end of the first contact carrier 14C, and the corresponding mating contacts 36.1C, 36.2C of the second inner contact-making site 36C, which is arranged at an end of the second contact carrier 34C. A middle contacting arrangement of the coaxial contacting arrangement 15C comprises a first contact pair that comprises a first contact 16.1C of the first inner contact-making site 16C and a corresponding first mating contact 36.1C of the second inner contact-making site 16C. An outer contacting arrangement of the coaxial contacting arrangement 15C comprises a second contact pair that comprises a second contact 16.2C of the first inner contact-making site 16C and a corresponding second mating contact 36.2C of the second inner contact-making site 16C. As is evident in particular in FIGS. 29 and 30, in the fourth exemplary embodiment of the sensor unit in accordance with the disclosure 1D, the first contact of the middle contacting arrangement of the coaxial contacting arrangement 15C is embodied as a contact pin 16.1C that is connected in an electrical manner by way of the first contact carrier 14C to a first cable contact 18.1C of the cable-contacting arrangement 18C. The second contact of the outer contacting arrangement of the coaxial contacting arrangement 15C is embodied as a contact pin 16.2C that is connected in an electrical manner by way of the first contact carrier 14C to a second cable contact 18.2CB of the cable-contacting arrangement 18C. In the fourth exemplary embodiment of the sensor unit 1D, the coaxial contacting arrangement 15C comprises a contact disc 16.5C that comprises an electrical conductive outer ring 16.3C having multiple contact openings and an electrical conductive inner ring 16.4C having a contact opening. The first contact that is embodied as a contact pin 16.1A is connected in an electrical manner to the inner ring 16.4C of the contact disc 16.5C. A first mating contact that is embodied as a contact pin 36.1C is connected in an electrical manner by way of the contact opening in the inner ring 16.4C to the inner ring 16.4C. The second contact that is embodied as a contact pin 16.2C is connected in an electrical manner to the outer ring 16.3C and a second mating contact that is embodied as a contact pin 36.2C is connected in an electrical manner by way of one of the contact openings to the outer ring 16.3C. The contact disc 16.5C can be pushed onto the contacts, which are embodied as contact pins 16.1C, 16.2C, by way of example after injection molding the base body 12D of the cable module 10D, said contacts being received by corresponding contact openings. The first mating contacts 36.1C of the second inner contact-making site 36C is embodied as a middle contact pin 36.1C that in the assembled state is pushed into the contact opening of the inner ring 16.4C and by way of the inner ring 16.4C produces an electrical connection to the first contact 16.1C. The second mating contact 36.2 is embodied as an outer middle contact pin 36.2C that in the assembled state is pushed into one of the contact openings of the outer ring 16.3C and by way of the outer ring 16.3C is connected in an electrical manner to the second contact 16.2C. This arrangement likewise renders it possible to make contact irrespective of the angular position. The first mating contact 36.1C of the second inner contact-making site 36C is connected in an electrically conductive manner by way of a first current path of the second contact carrier 34C to a first sensor contact 38.1C of the sensor-contacting arrangement 38C. The second mating contact 36.2C of the second inner contact-making site 36C is connected in an electrically conductive manner by way of a second current path of the second contact carrier 34C to a second sensor contact 38.2C of the sensor-contacting arrangement 38C. In the fourth exemplary embodiment of the sensor unit in accordance with the disclosure 1D, the two sensor contacts 38.1C, 38.2C of the sensor-contacting arrangement 38C are embodied in a similar manner to the third exemplary embodiment in each case as an outer middle contact bracket that can be connected in an electrical manner to the corresponding contact sites [not further described] of the sensor circuit 22C by way of example by means of soldering, riveting and/or welding.

In a similar manner to the other exemplary embodiments, the electrical cable-contacting arrangement 18C between the connection cable 3 and the at least one cable contact 18.1C, 18.2C in the third exemplary embodiment of the sensor unit in accordance with the disclosure 1D is embodied as a mechanical connection in the form of a crimp connection. As an alternative, the mechanical connection can be embodied by way of example as an insulation displacement connection. By virtue of the mechanical connection, a first individual lead 3.1 is connected in an electrical manner to the first cable contact 18.1C, and a second individual lead 3.2 is connected in an electrical manner to the second cable contact 18.2C.

Figure 24:
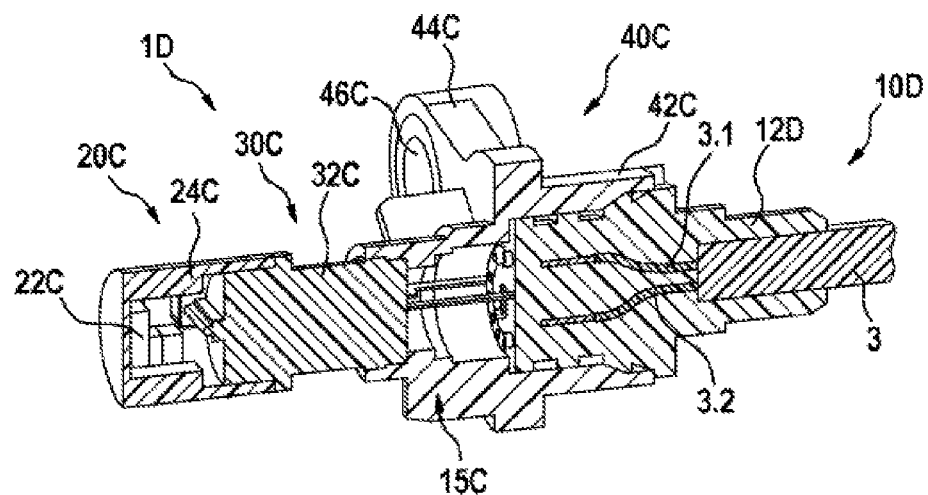
FIG. 24 illustrates a schematic perspective sectional view of the sensor unit in accordance with the disclosure shown in FIG. 23.
Figure 25:
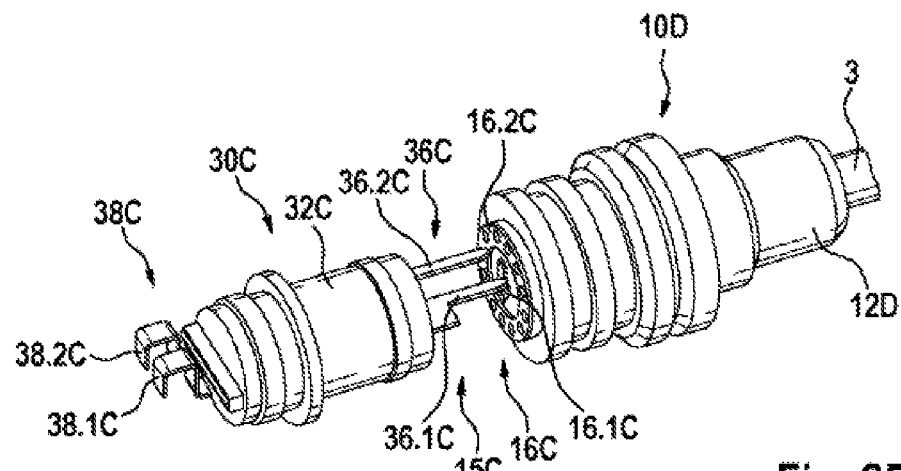
FIG. 25 illustrates a schematic perspective view of a third exemplary embodiment of a contact-making module and a fourth exemplary embodiment of a cable module for the sensor unit in accordance with the disclosure in accordance with FIG. 23 and FIG. 24.
Figure 26:
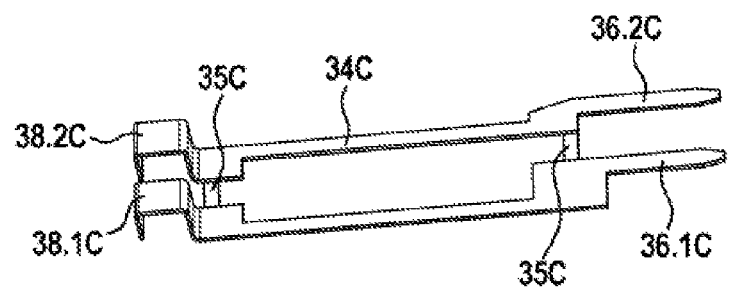
FIGS. 26 to 28 illustrate in each case a view of intermediate products during the production of the third exemplary embodiment of the contact-making module and during the production of a third exemplary embodiment of a sensor module for the sensor unit in accordance with the disclosure in accordance with FIG. 23 and FIG. 24.
Figure 27:
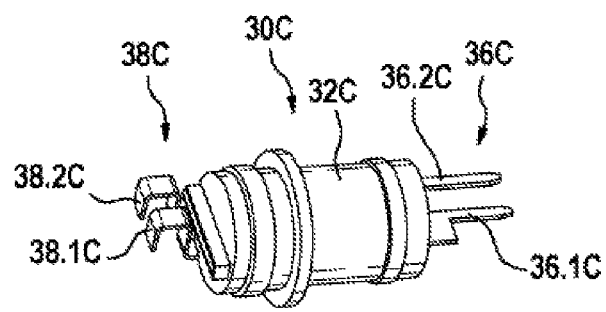
Figure 28:
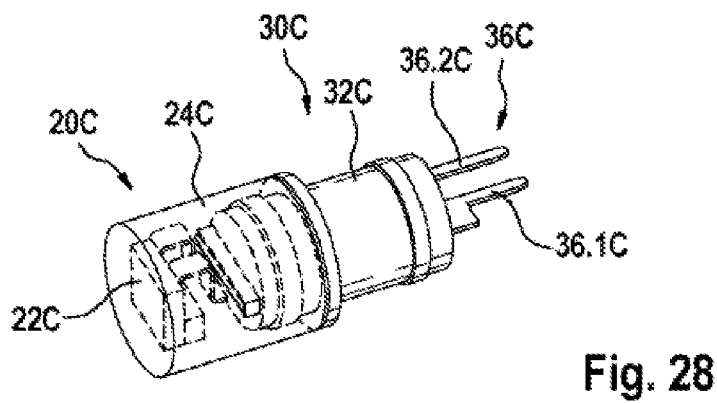
Figure 29:
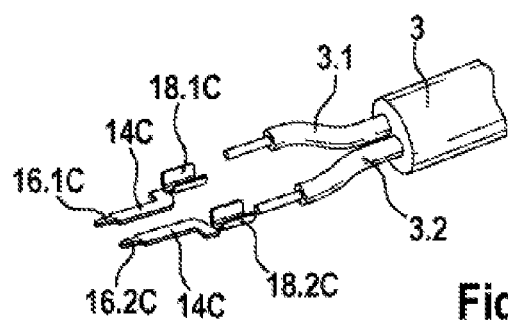
FIGS. 29 to 32 illustrate in each case a view of intermediate products during the production of the fourth exemplary embodiment of the cable module for the sensor unit in accordance with the disclosure in accordance with FIG. 23 and FIG. 24.
Figure 30:
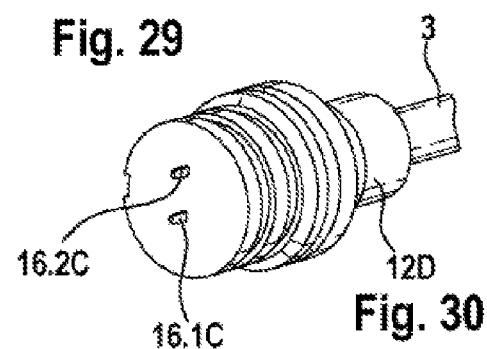
Figure 31:
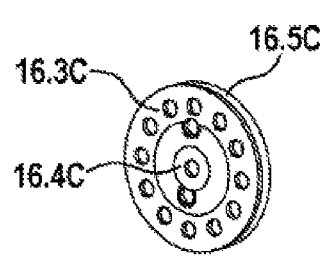
Figure 32:
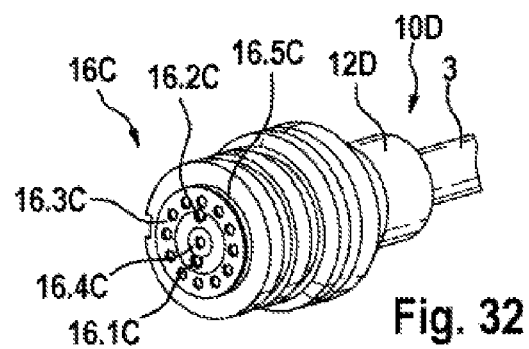
Figure 33:
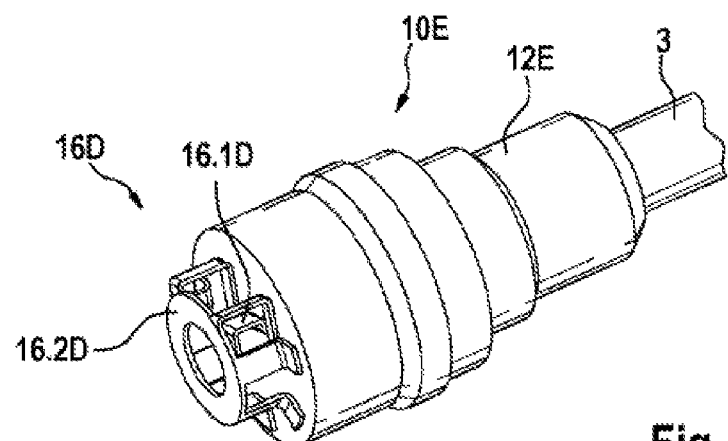
FIG. 33 illustrates a schematic perspective view of a fifth exemplary embodiment of a cable module for a sensor unit in accordance with the disclosure.
Figure 34:
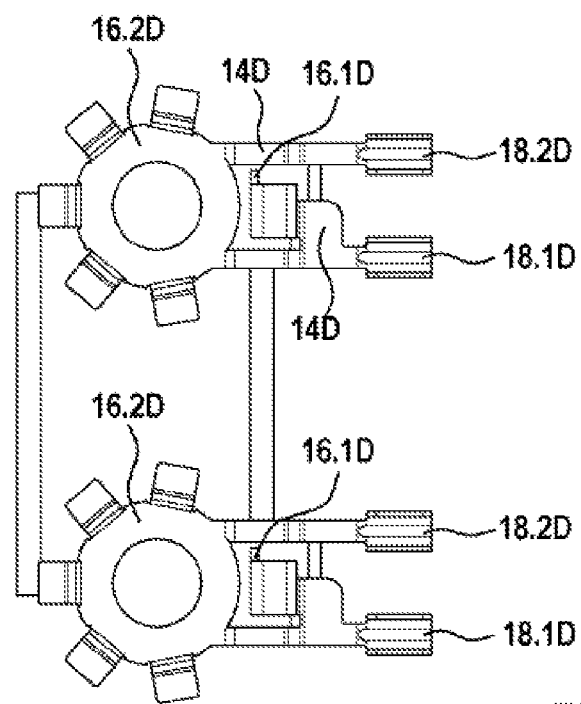
FIGS. 34 to 39 illustrate in each case a view of intermediate products during the production of the fifth exemplary embodiment of the cable module in accordance with FIG. 33 for a sensor unit in accordance with the disclosure.
Figure 35:
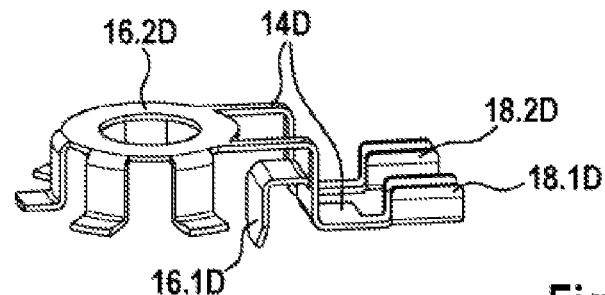
Figure 36:
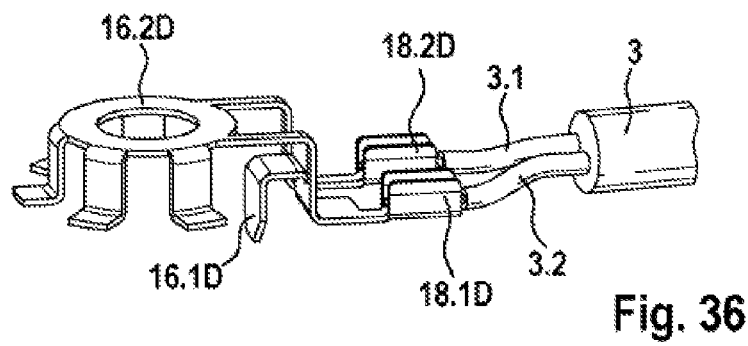
Figure 37:
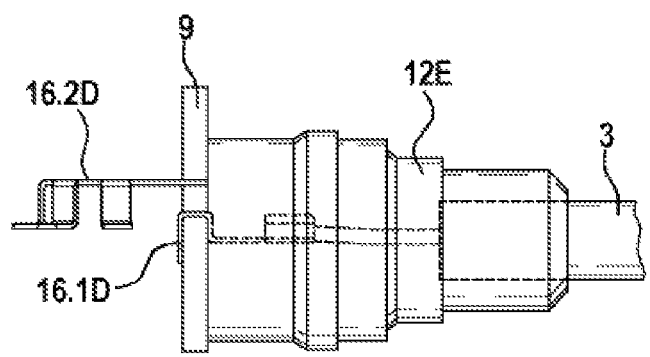
Figure 38:
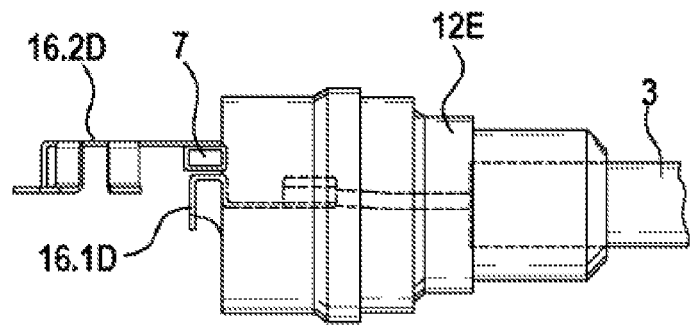
Figure 39:
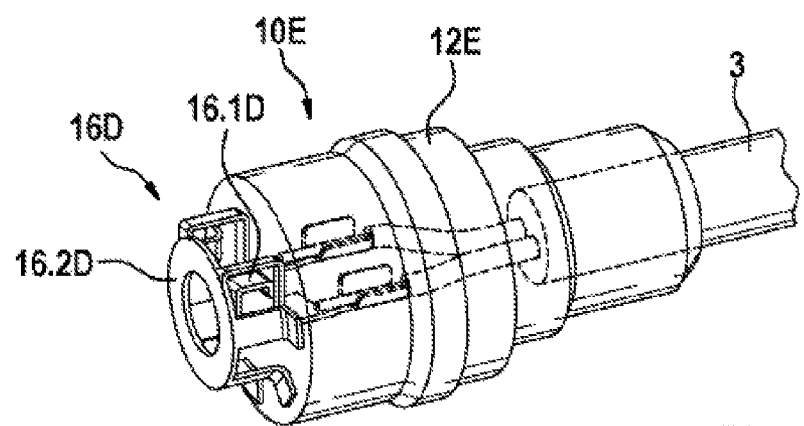

As is further evident in FIGS. 23 and 24, a base body 42C of an attachment module 40C is embodied as a synthetic material injection molded part that encompasses the region of coaxial contacting arrangement 15C and is injection molded and pushed onto a sensor-side end of the cable module 10C and onto a cable-side end of the contact-making module 30C. In a similar manner to the other exemplary embodiments, the attachment module 40C in the illustrated fourth exemplary embodiment of the sensor unit in accordance with the disclosure 1D comprises an attachment bracket 44C that is formed as one on the base body 42C and comprises an attachment eyelet 46C. The attachment eyelet 46C can be inserted by way of example as an insertion part into the injection molding tool or can be pressed into a corresponding opening in the attachment bracket 44C after the injection molding process.

In order to assemble the sensor unit 1D, the sensor circuit 22C of the sensor module 20C is contacted in an electrical manner by way of the corresponding contact sites at the sensor contacts 38.1C, 38.2C of the sensor-contacting arrangement 38C of the contact-making module. Subsequently, the cap 24C of the sensor module 20C is pushed onto the contact-making module 30C and attached thereto in a fluid-tight manner. In addition, the cable module 10C and the contact-making module 30C are plugged together by way of the coaxial contacting arrangement 15C and the attachment module 40C is injection molded on. As an alternative, the base body 42C of the attachment module 40C is pushed onto the base body 12D of the cable module 10D or onto the base body 32C of the contact-making module 30C and attached thereto in a fluid manner prior to plugging together the cable module 10D and the contact-making module 30C by way of the coaxial contacting arrangement 15C. After the sensor unit 1D has been assembled, the individual contacts 16.1C, 16.2C of the first inner contact-making site 16C and the corresponding mating contacts 36.1C, 36.2C of the second inner contact-making site 36C are connected in an electrical manner one to the other. The connection sites between the modules 10D, 20C, 30C, 40C are designed in such a manner that a mechanical pre-fixing procedure and a final connecting procedure can be performed using a laser. In addition, the connections between the modules 10D, 20C, 30C, 40C can be designed in such a manner that a sealing arrangement can be achieved by way of an optional seal (for example an O-ring). It is thus possible to arrange an optional seal by way of example between the cap 24C of the sensor module 20C and the base body 32C of the contact-making module 40C and/or between the base body 42C of the attachment module 40C and the base body 32C of the contact-making module 40C and/or between the base body 12D of the cable module 10D and the base body 42C of the attachment module 40C. The length of the sensor unit 1D can be varied by means of contact-making modules 30C of different lengths, without influencing the connection sites, in other words the sensor-contacting arrangement 38C and/or the coaxial contacting arrangement 15C and/or the cable-contacting arrangement 18C.

As is further evident in FIGS. 33 to 39, a fifth cable module 10E guides the connection cable 3 in a similar manner to the first exemplary embodiment of the sensor unit in accordance with the disclosure 1A in an axial manner with respect to the first inner contact-making site 16D. The illustrated fifth cable module can be connected by way of example to the first contact-making module 30A of the first exemplary embodiment of the sensor unit in accordance with the disclosure 1A.

As is further evident in FIGS. 33 to 39, the base body 12E of the cable module 10E is embodied in a similar manner to the other exemplary embodiments as a synthetic material injection molded part that encases at least in part the contact carrier 14D that is embodied as a stamped and bent part. As is evident in FIG. 34, multiple contact carriers 14D are connected one to the other by way of corresponding connection pieces [not further described] that are separate from one another prior to the injection molding process.

As is further evident in FIGS. 33 to 39, the individual contacts 16.1D, 16.2D of the first inner contact-making site 16D for the coaxial contacting arrangement 5A is arranged at a first end of the first contact carrier 14D. The first contact for the middle contacting arrangement of the coaxial contacting arrangement is embodied as a contact surface 16.1D that is connected in an electrical manner by way of the first contact carrier 14D to a first cable contact 18.1D of the cable-contacting arrangement 18D. The second contact for the outer contacting arrangement of the coaxial contacting arrangement is embodied as a contact ring surface 16.2D that is connected in an electrical manner by way of the first contact carrier 14D to a second cable contact 18.2D of the cable-contacting arrangement 18D. In order to produce the fifth cable module 10E, the contact carrier 14D is inserted into the injection molding tool in such a manner that a tool wall 9 separates the first contact 16.1D and the second contact 16.2D from the base body 12E that is to be produced for the cable module. Prior to inserting said contact carrier into the injection molding tool, the electrical cable-contacting arrangement 18D between the connection cable 3 and the at least one cable contact 18.1D, 18.2D is produced as a mechanical connection in the form of a crimp connection. As an alternative, the mechanical connection can be embodied by way of example as an insulation displacement connection. By virtue of the mechanical connection, a first individual lead 3.1 is connected in an electrical manner to the first cable contact 18.1D, and a second individual lead 3.2 is connected in an electrical manner to the second cable contact 18.2D. After the injection molding process, the contact carrier 14D having the second contact 16.2D is bent by way of a bending tool 7 so that the contact ring surface 16.2D is supported at an end face of the base body 12E of the cable module by way of multiple integral feet. The first contact, which is embodied as a contact surface 16.1D, and the second contact, which is embodied as a contact ring surface 16.2D, can be contacted by way of example in each case by mating contacts of a corresponding second inner contact-making site, said mating contacts being embodied as spring contacts (for example S-springs, C springs or leaf spring contacts). This arrangement also renders it possible to make contact irrespective of the angular position.

The invention claimed is:

1. A sensor unit for a vehicle comprising:
   a sensor circuit that is connected in an electrical manner to a connection cable via a sensor-contacting arrangement, a coaxial contacting arrangement, and a cable-contacting arrangement;
   the sensor-contacting arrangement including at least two sensor contacts
   the cable-contacting arrangement including at least two cable contacts; and
   the coaxial contacting arrangement arranged between the cable-contacting arrangement and the sensor-contacting arrangement and including:
      on a cable side, a first inner contact-making site having at least two contacts;
      on the sensor side, a second inner contact-making site having at least two mating contacts
      a first contact pair having a first contact and a corresponding first mating contact, the first contact pair forming a middle contacting arrangement; and
      a second contact pair having a second contact and a corresponding second mating contact, the second contact pair forming an outer contacting arrangement arrangement.

2. The sensor unit as claimed in claim 1, further comprising:
   a common first contact carrier; and
   a first base body;
   wherein the cable-contacting arrangement and the first inner contact-making site of the coaxial contacting arrangement are disposed at different ends of the common first contact carrier and
   wherein the common first contact carrier, the first base body, and the connection cable together form a cable module.

3. The sensor unit as claimed in claim 2, wherein the cable module guides the connection cable in an axial fashion or at a predetermined angle with respect to the first inner contact-making site.

4. The sensor unit as claimed in claim 2, further comprising:

a common second contact carrier; and
a second base body;
wherein the sensor-contacting arrangement and the second inner contact-making site of the coaxial contacting arrangement are disposed at different ends of the common second contact carrier;
wherein the common second contact carrier and the second base body form a contact-making module; and
wherein at least one of the first base body of the cable module and the second base body of the contact-making module is a synthetic injection material part that encompasses at least in part the respective contact carrier.

5. The sensor unit as claimed in claim 4, wherein the common contact carriers are embodied as stamped and bent parts, and have predetermined separation sites that enable division of the common contact carriers into individual current paths.

6. The sensor unit as claimed in claim 4, further comprising:
an attachment module that includes a third base body embodied as a synthetic material injection molded part that encases the coaxial contacting arrangement.

7. The sensor unit as claimed in claim 6, wherein the attachment module further includes an attachment bracket that is integral with the third base body and defines an attachment eyelet.

8. The sensor unit as claimed in claim 6, wherein the cable module and the contact-making module are inserted in a fluid-tight manner into the attachment module.

9. The sensor unit as claimed in claim 6, further comprising a cap, wherein the sensor circuit is arranged in the cap and together with said cap forms a sensor module, wherein at least one of the cable module, the contact-making module, the attachment module, and the sensor module are embodied as pre-assembled modules.

10. The sensor unit as claimed in claim 4, further comprising a cap, wherein the sensor circuit is arranged in the cap and together with said cap forms a sensor module.

11. The sensor unit as claimed in claim 10, wherein:
the sensor module is inserted in a fluid-tight manner onto the contact-making module; and
the sensor circuit is connected in an electrical manner via the sensor-contacting arrangement.

12. The sensor unit as claimed in claim 1, further comprising:
a common second contact carrier; and
a second base body;
wherein the sensor-contacting arrangement and the second inner contact-making site of the coaxial contacting arrangement are disposed at different ends of the common second contact carrier, and
wherein the common second contact carrier and the second base body form a contact-making module.

13. The sensor unit as claimed in claim 1, wherein the coaxial contacting arrangement includes at least one of a resilient-elastic connection and a plug-type connection between the individual contacts and the corresponding mating contacts.

14. The sensor unit as claimed in claim 1, wherein:
the first contact of the middle contacting arrangement of the coaxial contacting arrangement includes:
a contact surface;
a contact surface having a receiving opening; or
a contact pin; and
the second contact of the outer contacting arrangement of the coaxial contacting arrangement includes:
a contact pin
a contact clamp; or
a contact ring surface.

15. The sensor unit as claimed in claim 1, wherein:
the first mating contact of the middle contacting arrangement of the coaxial contacting arrangement includes a spring contact or a contact pin; and
the second mating contact of the outer contacting arrangement of the coaxial contacting arrangement includes a spring contact, a contact pin, or a contact clamp.

16. The sensor unit as claimed in claim 15, wherein the outer contacting arrangement of the coaxial contacting arrangement includes a contact ring that connects in an electrical manner the second contact, which includes a contact pin, to the second mating contact, which includes a contact spring.

17. The sensor unit as claimed in claim 15, further comprising a further coaxial contacting arrangement, wherein an outer contacting arrangement of the further coaxial contacting arrangement includes an electrically conductive bush that connects in an electrical manner the second contact, which includes a contact clamp, to the second mating contact, which includes a contact clamp.

18. The sensor unit as claimed in claim 15, further comprising:
a third coaxial contacting arrangement including:
a contact disc that has:
an electrically conductive outer ring defining multiple contact openings; and
an electrically conductive inner ring, which defines a contact opening;
wherein:
the first contact that includes a contact pin and is connected in an electrical manner to the inner ring;
the first mating contact that includes a contact pin and is connected in an electrical manner via the contact opening to the inner ring;
the second contact that includes a contact pin and is connected in an electrical manner to the outer ring; and
the second mating contact that includes a contact pin and is connected in an electrical manner via one of the contact openings to the outer ring.

19. The sensor unit as claimed in claim 1, wherein the cable-contacting arrangement between the connection cable and the at least two cable contacts includes a mechanical connection.

20. A sensor unit for a vehicle comprising:
a sensor circuit that is connected in an electrical manner to a connection cable via a sensor-contacting arrangement, a coaxial contacting arrangement, and a cable-contacting arrangement, wherein:
the sensor-contacting arrangement includes at least two sensor contacts
the cable-contacting arrangement includes at least two cable contacts; and
the coaxial contacting arrangement is arranged between the cable-contacting arrangement and the sensor-contacting arrangement, and includes:
on a cable side, a first inner contact-making site having at least two contacts; and
on the sensor side, a second inner contact-making site having at least two mating contacts;
a common first contact carrier;
a first base body, wherein;
the cable-contacting arrangement and the first inner contact-making site of the coaxial contacting arrangement are disposed at different ends of the common first contact carrier; and the common first contact carrier, the first base body, and the connection cable together form a cable module;

a common second contact carrier; and a second base body, wherein:

the sensor-contacting arrangement and the second inner contact-making site of the coaxial contacting arrangement are disposed at different ends of the common second contact carrier;

the common second contact carrier and the second base body form a contact-making module; and at least one of the first base body of the cable module and the second base body of the contact-making module is a synthetic injection material part that encompasses at least in part the respective contact carrier;

wherein the first and second common contact carriers are embodied as stamped and bent parts, and have predetermined separation sites that enable division of the first and second common contact carriers into individual current paths.

21. The sensor unit as claimed in claim 20, wherein the cable module guides the connection cable in an axial fashion or at a predetermined angle with respect to the first inner contact-making site.

22. The sensor unit as claimed in claim 20, wherein the coaxial contacting arrangement includes at least one of a resilient-elastic connection and a plug-type connection between the individual contacts and the corresponding mating contacts.

23. The sensor unit as claimed in claim 20, wherein the cable-contacting arrangement between the connection cable and the at least two cable contacts includes a mechanical connection.

24. The sensor unit as claimed in claim 20, further comprising:

an attachment module that includes a third base body embodied as a synthetic material injection molded part that encases the coaxial contacting arrangement.

25. The sensor unit as claimed in claim 24, wherein the attachment module further includes an attachment bracket that is integral with the third base body and defines an attachment eyelet.

26. The sensor unit as claimed in claim 24, wherein the cable module and the contact-making module are inserted in a fluid-tight manner into the attachment module.

27. The sensor unit as claimed in claim 20, further comprising a cap, wherein the sensor circuit is arranged in the cap and together with said cap forms a sensor module.

28. The sensor unit as claimed in claim 27, wherein:

the sensor module is inserted in a fluid-tight manner onto the contact-making module; and the sensor circuit is connected in an electrical manner via the sensor-contacting arrangement.

\* \* \* \* \*

UNITED STATES PATENT AND TRADEMARK OFFICE
CERTIFICATE OF CORRECTION

PATENT NO. : 10,175,069 B2
APPLICATION NO. : 15/116957
DATED : January 8, 2019
INVENTOR(S) : Steinbrink et al.

Page 1 of 1

It is certified that error appears in the above-identified patent and that said Letters Patent is hereby corrected as shown below:

In the Claims

In Column 16, Lines 47-50 of Claim 1 should read:
a second contact pair having a second contact and a
    corresponding second mating contact, the second
    contact pair forming an outer contacting arrange-
    ment.

Signed and Sealed this
Eighteenth Day of June, 2019

Andrei Iancu
*Director of the United States Patent and Trademark Office*